United States Patent
Wachs et al.

(10) Patent No.: US 6,226,491 B1
(45) Date of Patent: *May 1, 2001

(54) ACCESS CONTROL FOR MULTI-ACCESS SATELLITE COMMUNICATION SYSTEM

(75) Inventors: Marvin R. Wachs, Calabasas; Arnold L. Berman, Los Angeles, both of CA (US)

(73) Assignee: Hughes Electronics Corporation, El Segundo, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/944,481

(22) Filed: Oct. 6, 1997

(51) Int. Cl.[7] ................................... H04B 7/185
(52) U.S. Cl. ................ 455/12.1; 370/316; 370/320
(58) Field of Search ................ 370/316, 320, 370/331, 335, 342; 375/200, 202, 206, 208, 219; 455/88, 71, 70, 509, 430, 427, 13.2, 12.1, 411

(56) References Cited

U.S. PATENT DOCUMENTS

| | | | |
|---|---|---|---|
| 5,303,286 | * 4/1994 | Wiedeman | 379/59 |
| 5,748,669 | * 5/1998 | Yada | 375/202 |
| 5,793,795 | * 8/1998 | Li | 375/200 |

OTHER PUBLICATIONS

Dixon, Robert C., Spread Spectrum Systems With Commercial Applications, p. 32, 1994.*

* cited by examiner

Primary Examiner—Edward F. Urban
Assistant Examiner—Enrique L. Santiago
(74) Attorney, Agent, or Firm—Vijayalakshmi D. Duraiswamy; Michael W. Sales

(57) ABSTRACT

A system and method for restricting access to a satellite repeater transponder (100) utilizes a pseudo-random noise generator (102) to automatically modulate a local oscillator (18) about a nominal frequency during frequency translation within the satellite transponder. The carrier signals of authorized user terminals (106) will be modulated with a matching or inverse noise waveform produced by a pseudo-random noise generator (114), so that the noise signal modulated onto the carrier signal will only be cancelled out in authorized transmissions. Thus, an unauthorized user terminal will be unable to recover the baseband signal due to insufficient carrier to noise ratio in the expanded bandwidth created by the pseudo-random frequency modulation in the satellite repeater.

11 Claims, 2 Drawing Sheets

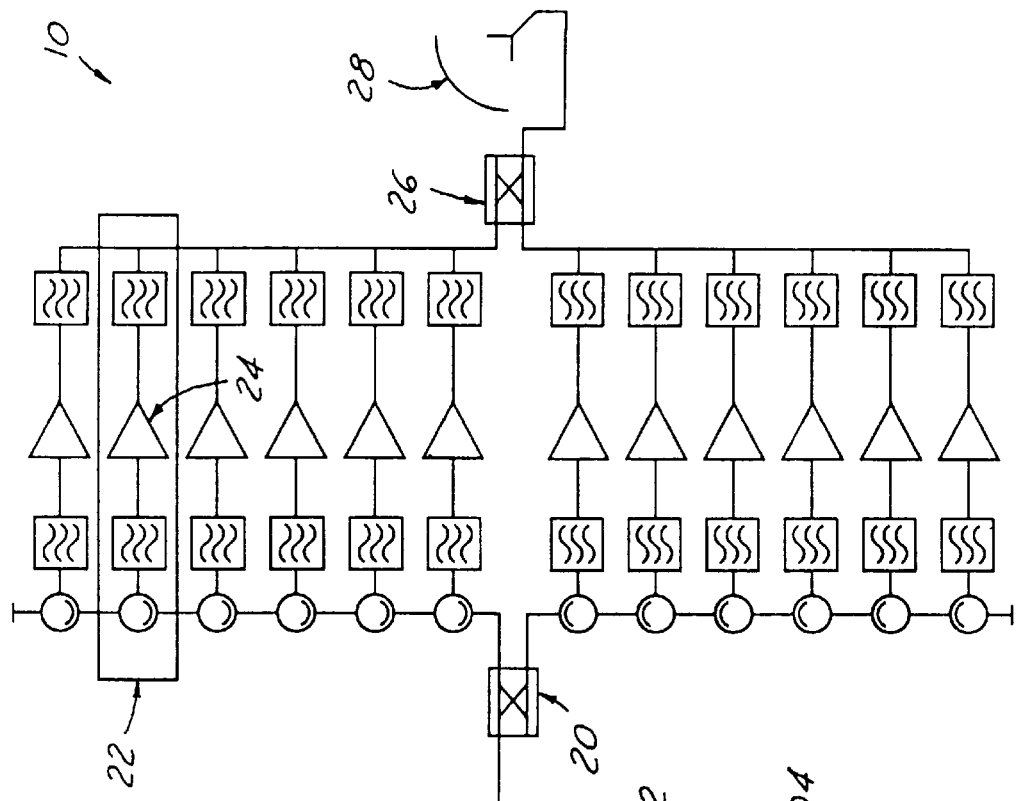
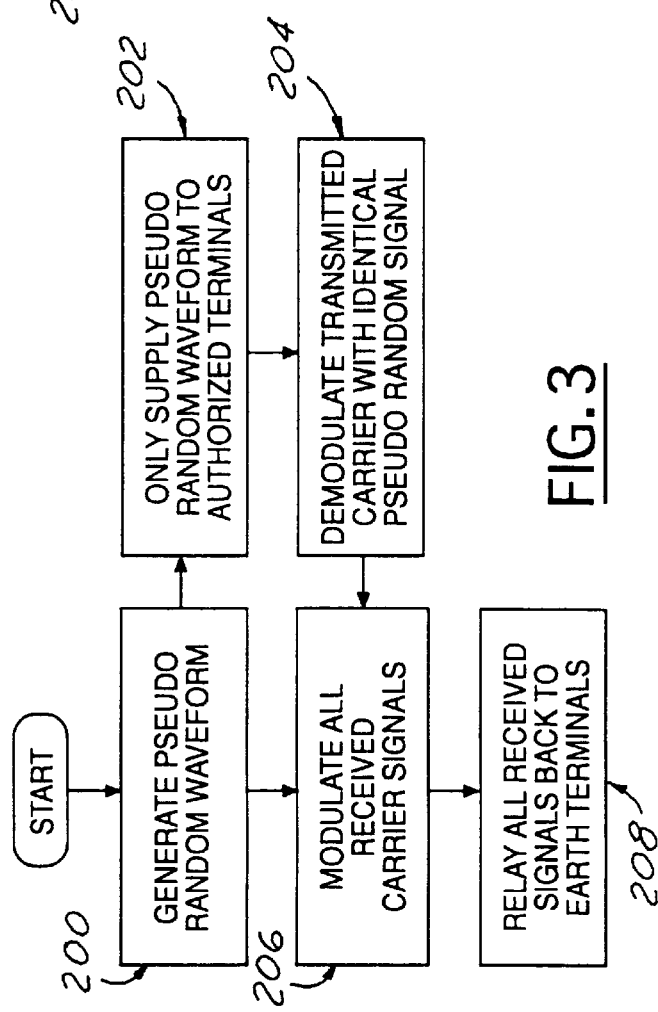
FIG. 1 (PRIOR ART)
FIG. 3

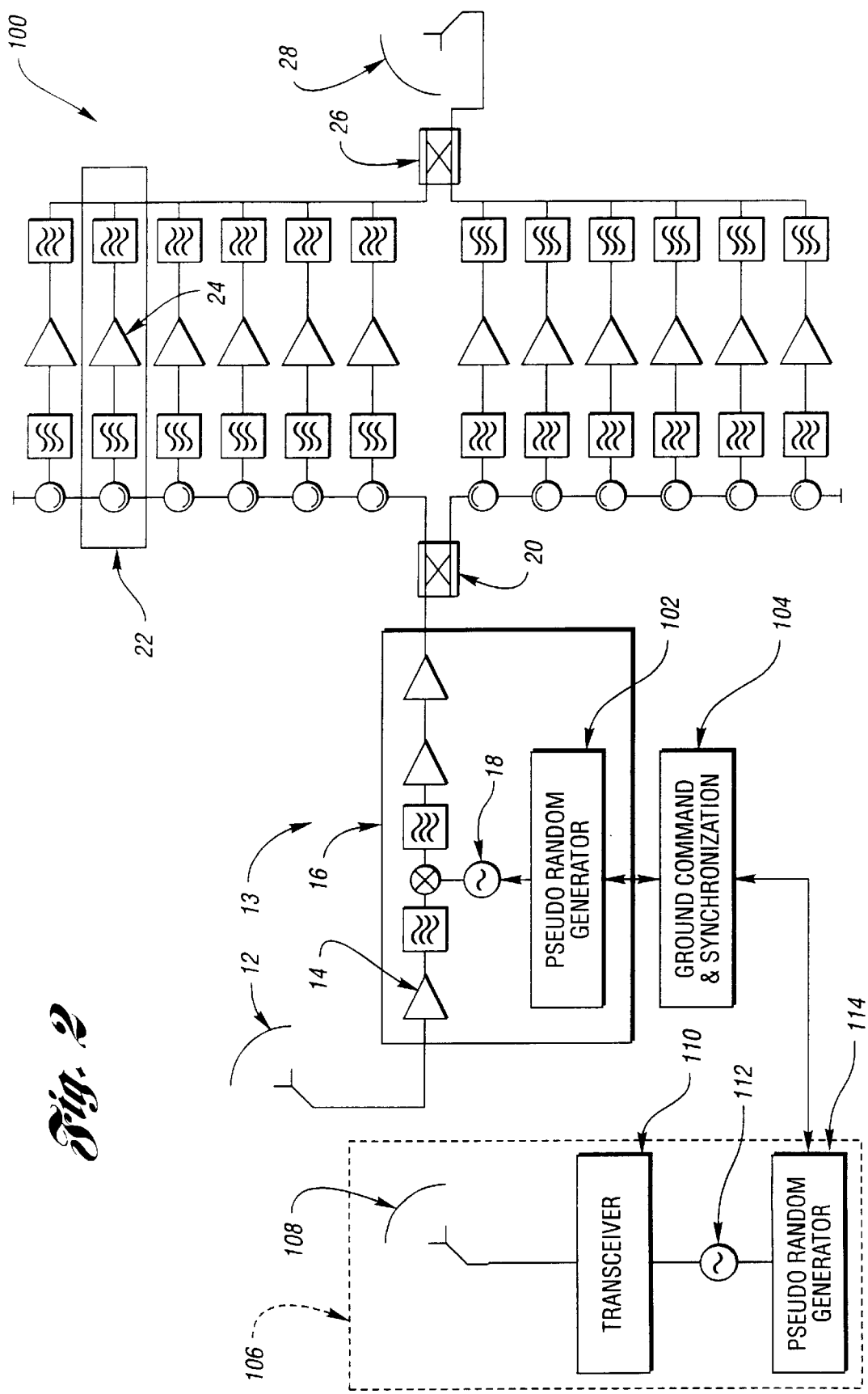

ACCESS CONTROL FOR MULTI-ACCESS SATELLITE COMMUNICATION SYSTEM

TECHNICAL FIELD

The present invention relates to multiple access satellite communications systems, and more particularly to inhibiting unauthorized access to such systems.

BACKGROUND ART

In general, the evolution of satellite system designs which allow for use of small, low cost earth stations has significantly increased the opportunity for an unauthorized, or "pirate" operator, to gain access to a communications satellite transponder. This is particularly true for conventional "bent pipe" pseudo-linear transponders.

More specifically, as shown in FIG. 1, a conventional bent pipe repeater 10 receives individual carriers transmitted by authorized earth stations via antenna system 12. The received signals are processed in a signal processing subsystem 13, wherein the carriers are amplified by a low noise amplifier 14 and then frequency translated, as a group, to the desired down link frequency via a mixer or translator 16. A local oscillator 18 is required for the frequency translation and is fixed in frequency and normally crystal controlled. The frequency translated spectrum is then demultiplexed in demux 20 into frequency passband channels. Each channel is applied to the appropriate channel conditioning circuits 22, and high power amplifiers 24. The outputs of the high power amplifiers are then recombined, using a frequency multiplexing technique in mux 26, and applied to the transmit antenna system 28 where they are radiated to the appropriate earth terminals. In such a conventional repeater, each carrier transmitted from the satellite is an exact amplified replica of the carrier received.

Past approaches to preventing unauthorized access to such repeaters have required inclusion of specialized on-board circuitry for demodulating, remodulating, signal processing, and signal switching. However, the addition of such on-board circuitry has not proven satisfactory because of a concomitant increase in system complexity and cost, as well as undesirably increasing payload size and weight of the satellite.

DISCLOSURE OF THE INVENTION

It is therefore an object of the present invention to provide an improved method and system for restricting access to a multiple-access satellite communication transponder to prohibit unauthorized users from gaining access thereof.

It is another object of the present invention to provide an improved method and system for inhibiting unauthorized access to a multiple-access satellite communication transponder which does not significantly increase payload size and weight.

It is yet another object of the present invention to provide a method and system for inhibiting unauthorized access to a multiple-access satellite communication transponder which utilizes pseudo-random modulation in the satellite transponder to prevent proper reception by unauthorized earth terminals.

In accordance with these and other objects, the present invention provides a system for inhibiting unauthorized access to a multiple-access satellite communication transponder comprising a receiving antenna subsystem located in the satellite repeater, a first pseudo-random noise generator located in the satellite repeater, and a mixer having a local oscillator connected to the first pseudo-random noise generator. The local oscillator is frequency modulated about a nominal frequency with a waveform generated by the first pseudo-random noise generator. A second pseudo-random noise generator located in each authorized user terminal is used to frequency modulate the transmitted carrier with an inverse of the pseudo-random waveform in addition to its normal baseband modulation. A controller is provided for synchronizing the first and second pseudo-random noise generators.

In accordance with another aspect of the present invention, a method is provided for restricting access to a satellite repeater having a receiving antenna subsystem connected to a signal processing subsystem, wherein the method comprises the steps of generating a pseudo-random noise signal in the satellite signal processing subsystem, synchronizing the pseudo-random noise signal with an inverse of the generated pseudo-random signal, and modulating a carrier signal in the authorized user terminal with the inverse pseudo-random signal. All carrier signals received at the satellite repeater are modulated with the generated pseudo-random signal.

Thus, in accordance with the present invention, frequency translation by the satellite transponder automatically removes the pseudo-random frequency modulation from authorized communications carriers. The removal of this frequency modulation reduces the rf bandwidth of each carrier to that required by its respective communications modulation. An unauthorized carrier attempting to access the satellite will not have the inverse pseudo-random frequency modulation. Thus, frequency translation by the satellite transponder for unauthorized carriers will impart pseudo-random modulation on these carriers thereby increasing their rf bandwidth.

These and other features, aspects, and embodiments of the present invention will become better understood with regard to the following description, appended claims, and accompanying drawings.

BRIEF DESCRIPTION OF THE DRAWINGS

FIG. 1 is a block diagram of a conventional bent-pipe satellite transponder;

FIG. 2 is a block diagram of a satellite transponder in accordance with the present invention; and FIG. 3 is a flow chart illustrating operation of the present invention.

BEST MODE FOR CARRYING OUT THE INVENTION

Referring to FIG. 2, a satellite repeater 100 is shown in accordance with the present invention, wherein like elements to those described above in connection with the conventional repeater 10 shown in FIG. 1 have been denoted with the same reference numbers.

In accordance with the present invention, the frequency translator 16 includes a pseudo-random noise generator 102 coupled to the local oscillator 18 so as to automatically frequency modulate all received carrier signals during frequency translation. More specifically, the pseudo-random waveform modulates the local oscillator 18 about a nominal frequency, which is then used to drive mixer 16. Operating parameters, such as the code key for generating the pseudo-random waveform and synchronization information, can be established by a ground command controller 104. The ground command controller is also arranged to communicate the operating parameters to authorized user terminal(s) 106 which have incorporated therein an antenna subsystem 108, a transceiver subsystem 110 having a variable local oscillator 112, and a pseudo-random noise generator 114 similar to generator 102.

Ground command controller 104 is further arranged to provide suitable synchronization between authorized transmitting terminal(s) 106 and the satellite transponder 100 such that an authorized transmitting terminal will modulate the transmitted carrier signal with an inverted form of the generated pseudo-random waveform. Synchronization can be established using any technique known to one having ordinary skill in the art. Thus, when transponder 100 receives a properly authorized carrier signal, the transponder will automatically remove or cancel the matching inverse modulation simply by modulating the carrier during its normal frequency translation process. Although a ground command controller 104 is shown and described, it will be appreciated that other alternative means of synchronization between the pseudo-random generators are equally applicable.

As a result of the pseudo-random frequency modulation in transponder 100, noise-like modulation is added to the rf frequency when the unauthorized carrier is received by an earth user terminal, and the bandwidth of the carrier is expanded. In further accordance with the present invention, the level of modulation is adjusted in any manner known to one of ordinary skill in the art so that when a carrier is received by any authorized or unauthorized earth terminal the carrier-to-noise ratio in the expanded bandwidth will be insufficient to allow recovery of the desired baseband. In other words, the pseudo-random frequency modulation in transponder 100 effectively creates a spread spectrum communication system having its bandwidth expanded enough to prevent unauthorized demodulation of the carrier.

The overall operation of the present invention is outlined in the flow chart of FIG. 3. More specifically, as shown at block 200, transponder 100 generates a pseudo-random waveform. At block 202, parameters for synchronously generating an inverse of the pseudo-random waveform are supplied only to an authorized transmitting earth user terminal, where a transmitted carrier signal is modulated by the inverse form of the generated waveform and synchronized with transponder 100 as shown at block 204. At block 206, all carrier signals received by the transponder are frequency modulated using the generated waveform. All received signals are subsequently relayed back to an earth user terminal as shown at block 208. Since only authorized signals would have had the random modulation cancelled, only an authorized terminal will be able to recover the baseband and properly receive the relayed signal.

Therefore, the present invention overcomes the deficiencies of known arrangements for restricting access to a satellite repeater transponder because on-board demodulation, re-modulation, complex signal processing or analysis, and specialized switching capabilities are not required. Thus, the present invention achieves authorized access control having a minimum impact on payload design. In such an embodiment, the authorized transmitting earth terminal would transmit signals without the pseudo-random modulation. The relayed signal could then be successfully demodulated only by an authorized receiving earth terminal.

While the present invention has been described in context with cancelling the modulation of authorized signals during frequency translation at the satellite transponders, it will be appreciated that the inverse/matching form of the pseudo-random waveform could be supplied to an authorized receiving earth terminal, where cancellation of the random modulation will occur during reception of the relayed carrier signal.

It should be noted that the present invention may be used in a wide variety of different constructions encompassing many alternatives, modifications, and variations which are apparent to those with ordinary skill in the art. Accordingly, the present invention is intended to embrace all such alternatives, modifications, and variations which fall within the spirit and broad scope of the appended claims.

What is claimed is:

1. A system for providing access of authorized user terminals to a satellite repeater, the system comprising:
   a receiving antenna subsystem located in said satellite repeater for receiving and modulating a carrier signal;
   a first pseudo-random noise generator located in said satellite repeater for generating a first pseudo-random waveform;
   a mixer comprising a local oscillator, said local oscillator coupled to said first pseudo-random noise generator to modulate said carrier signal with said first pseudo-random waveform;
   a second pseudo-random noise generator located in each authorized user terminal for generating a second pseudo-random waveform to modulate said carrier signal with said second pseudo-random waveform, said second pseudo-random waveform being the inverse of said first pseudo-random waveform; and
   a controller for synchronizing said first and second pseudo-random noise generators;
   wherein the receiving antenna subsystem modulates said carrier signal received at said satellite repeater with said first pseudo-random waveform and said authorized user terminal modulates said carrier signal with said second pseudo-random waveform to remove said first pseudo-random waveform from said carrier signal and provide access of said authorized user terminals to said satellite repeater and wherein said first pseudo-random waveform is not removed from the carrier signal of unauthorized user terminals to restrict access of said unauthorized user terminals to said satellite repeater.

2. The system of claim 1 wherein each authorized terminal further comprises a mixer connected to said second pseudo-random noise generator for modulating said carrier signal transmitted to said satellite repeater with said second pseudo-random waveform.

3. The system of claim 1 wherein each authorized terminal further comprises a mixer connected to said second pseudo-random noise generator for modulating said carrier signal received from said satellite repeater with said second pseudo-random waveform.

4. The system of claim 1 wherein said first pseudo-random noise generator modulates said local oscillator about a nominal frequency.

5. The system of claim 1 wherein said controller comprises a ground controller for relaying to an authorized user terminal at least one parameter used by said pseudo-random noise generator to generate said first pseudo-random waveform.

6. A method for granting access of authorized user terminals to a satellite repeater having a receiving antenna subsystem connected to a signal processing subsystem, said method comprising the steps of:
   in said satellite signal processing subsystem, generating a first pseudo-random waveform;

modulating a carrier signal received at said satellite repeater with said first pseudo-random waveform;

in an authorized user terminal, generating a second pseudo-random waveform, said second pseudo-random waveform being the inverse of said first pseudo-random waveform;

synchronizing said first pseudo-random waveform with said second pseudo-random waveform; and modulating said carrier signal in an authorized user terminal with said second pseudo-random waveform; and to remove said first pseudo-random waveform from the carrier signal and grant access of said authorized user terminal to said satellite repeater and to not remove said first pseudo-random waveform from carrier signals of unauthorized user terminals to restrict access of said unauthorized user terminals to said satellite repeater.

7. The method of claim 6 wherein said step of modulating said carrier signal with said second pseudo-random waveform is performed when said authorized user terminal transmits signal to said satellite repeater.

8. The method of claim 6 wherein said step of modulating said carrier signal with said second pseudo-random waveform is performed when said authorized user terminal receives said carrier signal from said satellite repeater.

9. The method of claim 6 wherein said signal processing subsystem comprises a frequency translator, and said step of modulating said carrier signal with said first pseudo-random waveform is performed during frequency translation.

10. The method of claim 9 comprising the step of modulating a local oscillator in said frequency translator about a nominal frequency with said first pseudo-random waveform.

11. The method of claim 6 further comprising the steps of selectively communicating at least one parameter for generating said first pseudo-random waveform only to an authorized user terminal.

* * * * *